US009746607B2

(12) United States Patent
Collins et al.

(10) Patent No.: US 9,746,607 B2
(45) Date of Patent: Aug. 29, 2017

(54) OPTICAL COUPLING SCHEME

(71) Applicant: Huawei Technologies Co., Ltd., Shenzhen, Guangdong (CN)

(72) Inventors: Tom Collins, Munich (DE); Marco Lamponi, Ghent (BE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/147,611

(22) Filed: May 5, 2016

(65) Prior Publication Data

US 2016/0327742 A1 Nov. 10, 2016

(30) Foreign Application Priority Data

May 5, 2015 (EP) .................................... 15166333

(51) Int. Cl.
  *G02B 6/12* (2006.01)
  *G02B 6/122* (2006.01)
  *G02B 6/125* (2006.01)

(52) U.S. Cl.
  CPC ....... *G02B 6/1228* (2013.01); *G02B 6/12002* (2013.01); *G02B 6/125* (2013.01); *G02B 2006/121* (2013.01); *G02B 2006/12147* (2013.01)

(58) Field of Classification Search
  CPC .................................................. G02B 6/1228
  See application file for complete search history.

(56) References Cited

U.S. PATENT DOCUMENTS

| 6,282,345 B1 | 8/2001 | Schimpe |
| 7,095,920 B1 * | 8/2006 | Little ................. G02B 6/12002 385/131 |
| 8,031,991 B2 * | 10/2011 | Webster .............. G02B 6/1228 385/28 |
| 8,483,528 B2 * | 7/2013 | Socci .................... G02B 6/305 385/131 |

(Continued)

FOREIGN PATENT DOCUMENTS

| EP | 2 664 949 A2 | 11/2013 |
| GB | 2 053 555 A | 2/1981 |
| WO | WO 03/079053 A2 | 9/2003 |

OTHER PUBLICATIONS

Kim et al., "Optical properties of silicon oxynitride thin films determined by vacuum ultraviolet spectroscopic ellipsometry", CP683, Characterization and Metrology for ULSI Technology: 2003 International Conference, 2003 American Institude of Physics.*

(Continued)

*Primary Examiner* — Michelle R Connelly

(57) ABSTRACT

The present invention provides a waveguide structure for optical coupling. The waveguide structure includes a first waveguide embedded in a cladding of lower refractive index than the first waveguide, and a second waveguide of higher refractive index than the cladding and distanced from the first waveguide. The waveguide structure further includes an intermediate waveguide, of which at least a part is arranged between the first waveguide and the second waveguide. The first waveguide and the second waveguide each comprise a tapered end for coupling light into and/or out of the intermediate waveguide.

13 Claims, 17 Drawing Sheets

(56) References Cited

U.S. PATENT DOCUMENTS

| | | | | |
|---|---|---|---|---|
| 8,615,148 | B2* | 12/2013 | Chen | G02B 6/1228 385/43 |
| 8,837,884 | B2* | 9/2014 | Suzuki | G02B 6/305 385/27 |
| 8,873,906 | B2* | 10/2014 | Tokushima | G02B 6/1228 264/1.25 |
| 2002/0031296 | A1* | 3/2002 | Lee | B82Y 20/00 385/28 |
| 2004/0037497 | A1* | 2/2004 | Lee | G02B 6/132 385/28 |
| 2009/0003770 | A1* | 1/2009 | Gill | G02B 6/12002 385/49 |
| 2010/0040327 | A1* | 2/2010 | Deki | G02B 6/305 385/28 |
| 2010/0150500 | A1* | 6/2010 | Pyo | G02B 6/12004 385/37 |
| 2011/0026880 | A1* | 2/2011 | Galli | G02B 6/305 385/28 |
| 2011/0116741 | A1* | 5/2011 | Cevini | G02B 6/305 385/28 |
| 2011/0205660 | A1* | 8/2011 | Komura | B82Y 20/00 360/59 |
| 2013/0343695 | A1 | 12/2013 | Ben Bakir et al. | |
| 2014/0294341 | A1* | 10/2014 | Hatori | G02B 6/12 385/14 |
| 2015/0010266 | A1 | 1/2015 | Webster et al. | |
| 2016/0139334 | A1* | 5/2016 | Sakakibara | G02B 6/1228 385/43 |

OTHER PUBLICATIONS

Refractive index of GaAs (Gallium Arsenide)—Aspnes [online], RefractiveIndex.INFO website: 2008-2016 Mikhail Polyanskiy, [retrieved on Feb. 1, 2017]. Retrieved from the internet: <URL: http://refractiveindex.info/?shelf=main&book=GaAs&page=Aspnes>.*

Refractive index of InP (Indium phosphide)—Aspnes [online], RefractiveIndex.INFO website: 2008-2016 Mikhail Polyanskiy, [retrieved on Feb. 1, 2017]. Retrieved from the internet: <URL: http://refractiveindex.info/?shelf=main&book=InP&page=Aspnes>.*

Refractive index of Si (Silicon)—Aspnes [online], RefractiveIndex.INFO website: 2008-2016 Mikhail Polyanskiy, [retrieved on Feb. 1, 2017]. Retrieved from the internet: <URL: http://refractiveindex.info/?shelf=main&book=Si&page=Aspnes>.*

Refractive index of Si3N4 (Silicon nitride)—Luke [online], RefractiveIndex.INFO website: 2008-2016 Mikhail Polyanskiy, [retrieved on Feb. 1, 2017]. Retrieved from the internet: <URL: http://refractiveindex.info/?shelf=main&book=Si3N4&page=Luke>.*

Refractive index of SiC (Silicon carbide)—Shaffer [online], RefractiveIndex.INFO website: 2008-2016 Mikhail Polyanskiy, [retrieved on Feb. 1, 2017]. Retrieved from the internet: <URL: http://refractiveindex.info/?shelf=main&book=SiC&page=Shaffer>.*

Refractive index of SiO2 (Silicon dioxide, Silica, Quartz)—Malitson [online], RefractiveIndex.INFO website: 2008-2016 Mikhail Polyanskiy, [retrieved on Feb. 1, 2017]. Retrieved from the internet: <URL: http://refractiveindex.info/?shelf=main&book=SiO2&page=Malitson>.*

David W. Vernooy et al., "Alignment-Insensitive Coupling for PLC-Based Surface Mount Photonics", IEEE Photonics Technology Letters, vol. 16, No. 1, Jan. 2004, p. 269-271.

Ibrahim Murat Soganci et al., "Flip-chip optical couplers with scalable I/O count for silicon photonics", Optics Express, vol. 21, No. 13, Jul. 1, 2013, 11 pages.

Yang Zhang et al., "Inter-layer grating coupler on double-layer silicon nanomembranes", IEEE, 2013, p. 35-36.

Long Chen et al., "Low-Loss and Broadband Cantilever Couplers Between Standard Cleaved Fibers and High-Index-Contrast Si3N4 or Si Waveguides", IEEE Photonics Technology Letters, vol. 22, No. 23, Dec. 1, 2010, p. 1744-1746.

Daniel C. Lee et al., "Monolithic Chip-to-Chip WDM Optical Proximity Coupler Utilizing Echelle Grating Multiplexer/Demultiplexer Integrated with Micro Mirrors Built on SOI Platform", IEEE, 2010, p. 215-216.

* cited by examiner (b)

(a)

(b)

(b)

Section 2 length sweep

OPTICAL COUPLING SCHEME

CROSS-REFERENCE TO RELATED APPLICATION

This application claims priority to European Patent Application No. EP15166333.3, filed on May 5, 2015, which is hereby incorporated by reference in its entirety.

TECHNICAL FIELD

The present invention relates to the field of photonic integrated circuits (PIC). In particular, the present invention describes an optical coupling scheme, preferably for optically coupling from chip to chip. To this end, the present invention presents a waveguide structure for optical coupling, a chip including such a waveguide structure, and a method of fabricating the waveguide structure.

BACKGROUND

Silicon photonics is rapidly gaining importance as a generic technology platform for a wide range of applications. Such applications include, for instance, telecom, datacom, interconnect and sensing. Silicon photonics allows implementing photonic functions through the use of CMOS compatible wafer-scale technologies on high quality, low cost silicon substrates.

However, especially for telecom applications it is difficult to meet all performance requirements, when using conventional silicon passive devices. Instead, it has been found that a dramatically improved performance can be achieved by using high quality silicon nitride (SiN) technology, which is still a CMOS compatible wafer-scale technology. As a drawback, active devices cannot be fabricated using SiN.

One option to overcome this drawback is to monolithically integrate SiN waveguides with active devices fabricated using silicon, i.e., devices formed in silicon waveguides. However, high temperatures are necessary to ensure a high quality of the SiN waveguides. This also means that the silicon active devices must be formed on top of the SiN. This typically requires at least one wafer bond operation, in order to add silicon layers of the active devices to a patterned SiN PIC wafer. To nevertheless achieve high wafer bond yields, stringent cleanliness and planarization is required, which makes the fabrication of such integrated devices difficult and expensive.

Different groups have attempted to use grating couplers, in order to transfer light between different chips, for instance, Zhang et al., in "Inter-layer grating coupler on double-layer silicon nanomembranes", DOI: 10.1109/OIC.2013.6552911, Optical Interconnects Conference, 2013 IEEE.

However the reported coupling performance of these grating couplers is not very good, with optical losses being in the range of 8 dB. This level of optical loss is too excessive for most telecommunications applications.

Other groups have attempted to couple light between different chips using mirrors. However, the optical losses of nearly 3 dB are still unacceptable for low loss applications. Further, the fabrication of a mirror is not a CMOS compatible process.

Soganci et al. have reported, in "Flip-chip optical couplers with scalable I/O count for silicon photonics", Jul. 1, 2013, Vol. 21, No. 13, DOI: 10.1364/OE.21.016075, Optics Express 16075 IBM, a coupling of light between inverted tapers fabricated in silicon waveguides and polymer waveguides. The polymer waveguide is provided on a PCB. Losses as low as 1 dB per optical coupler were achieved at specific wavelengths, and demonstrate the superior performance, which can be achieved using adiabatic coupling between waveguides.

Similarly, D. W. Vernooy et al. have developed, in "Alignment-Insensitive Coupling for PLC-Based Surface Mount Photonics", IEEE PTL, 2004, a way of using adiabatic coupling between III-V chips and silica PLC. This approach enables a surface mount flip-chip of III-V components onto a PLC platform with optical losses <0.5 dB.

The III-V chip has a low index contrast output waveguide, and the light is transferred from an indium phosphide (InP) waveguide into this output waveguide. This transfer allows the mode to expand significantly, and to be coupled to a waveguide on the PLC (also of low index contrast), provided the surface mount brings them into close enough proximity.

However, the requirement for the close proximity of the waveguides requires a complex fabrication process. Normally a waveguide would be covered with a thick overclad material having a refractive index lower than a waveguide core. Removing this overclad material and stopping on the waveguide, or leaving a thin layer of the overclad material is necessary but complicated. Further, the removal leaves steps on the wafer surface of several microns height. To the contrary, accurate CMOS processing requires planar surfaces or steps of below one micron.

It has also been shown by Chen et al., in "Low-Loss and Broadband Cantilever Couplers Between Standard Cleaved Fibers and High-Index-Contrast SiN or Si Waveguides", IEEE Photonics Technology Letters, Vol. 22, No. 23, Dec. 1, 2010, that light can be transferred from a Si or SiN waveguide into a waveguide formed by underclad and overclad silica layers. The high refractive silicon is removed in the vicinity of this 'cantilever' waveguide. The surrounding material can be either air or a low index contrast polymer. Mode sizes of 4-9 µm can be achieved with this technique. To date this technique has been proposed specifically to couple light from a silicon photonics chip into a fiber.

Further, it is known from U.S. Pat. No. 6,282,345 B1 that light can be transferred from one waveguide to another waveguide on the same chip by engineering the respective widths of the waveguides. This approach has typically been used on III-V chips, where one layer is the active area and the other layer is a passive waveguide, which is more suited to coupling light into fiber.

SUMMARY

As is evident from the above description of the conventional optical coupling schemes a problem is that the coupling of light is so far not achieved in such a way that, firstly, all additional processing required is CMOS compatible (e.g., appropriate for silicon photonics chips), and that, secondly, the coupling efficiency is high (i.e. that the optical coupling loss is low) over a wide wavelength band.

In view of these disadvantages, an object of the present invention is to improve the conventional optical coupling scheme. The present invention has particularly the object to provide a structure for optical coupling with low optical losses, wherein the structure is also compatible with CMOS processing.

The above-mentioned object of the present invention is achieved by the solution provided in the enclosed independent claims. Advantageous implementations of the present invention are further defined in the dependent claims.

In particular the present invention proposes a waveguide structure, a chip including said waveguide structure, and a fabrication method of the waveguide structure, in order to realize a novel low-loss optical coupling scheme. The coupling scheme is specifically suited for transfer printing or flip-chip bonding active devices to a SiN PIC. To this end, the present invention realizes a waveguide structure, which waveguide structure allows transferring light, particularly transferring the light adiabatically, from a first waveguide covered with a cladding to a second waveguide, particularly to a surface waveguide. In this way it is possible to realize optical adiabatic coupling within a chip or from chip to chip, while all required processing remains CMOS compatible.

A first aspect of the present invention provides a waveguide structure for optical coupling, comprising a first waveguide embedded in a cladding of lower refractive index than the first waveguide, a second waveguide of higher refractive index than the cladding and distanced from the first waveguide, and an intermediate waveguide, of which at least a part is arranged between the first waveguide and the second waveguide, wherein the first waveguide and the second waveguide each comprise a tapered end for coupling light into and/or out of the intermediate waveguide.

With the three waveguides of the waveguide structure of the first aspect, light can be transferred, particularly adiabatically, with very low coupling losses, from the first waveguide to the second waveguide. The coupling losses and alignment tolerance, when properly designed adiabatic tapers are used, is below 1 dB. Such a performance cannot be achieved with conventional butt coupling, grating couplers or mirrors.

With the waveguide structure of the first aspect, light can, for instance, be transferred from within a chip to the chip's surface. In other words, the light can be brought to the surface of the chip. This enables more efficient optical chip-to-chip coupling, particularly on essentially planar wafers. Alternatively, the light can be transferred directly from one chip to another chip with very low optical coupling losses.

When the waveguide structure of the first aspect is used for optical chip-to-chip coupling, most of the area on a first chip, which lies under the attached second chip, can still be used for integrating circuits, since typically—for reasons of mechanical stability—the attachment area of the two chips is significantly larger than the area that is actually used for optical coupling.

In fact, with the waveguide structure of the first aspect, light can efficiently be transferred from the first waveguide to the second waveguide over a length of less than 500 μm. Thereby, the first waveguide and the second waveguide preferably extend at least substantially parallel to another in one direction, and the tapered end of the first waveguide overlaps with the tapered end of the second waveguide in said extension direction. More preferably the tapered end of the first waveguide overlaps with the tapered end of the second waveguide in said extension direction by about 500 μm or less, even more preferably by about 400 μm or less, most preferably by about 300 μm or less.

All processes required to fabricate the waveguide structure of the first aspect can be made compatible with CMOS processing and foundries, e.g., when SiN waveguides and silicon dioxide cladding (SiO2) are used, respectively. The processing also allows fabricating waveguide structures to be used for a chip-on-board broadband fiber-coupling scheme without additional process steps.

In a first implementation form of the waveguide structure of the first aspect, the intermediate waveguide is formed by or in a part of the cladding.

By using the cladding of the first waveguide for structuring the intermediate waveguide, i.e. by using the cladding to transfer the light from the first waveguide to the second waveguide, the waveguide structure of the first aspect can be processed faster, CMOS compatible, and with less material required. Furthermore, more compact waveguide structures can be achieved.

In a second implementation form of the waveguide structure according to the first aspect as such or according to the first implementation form of the first aspect, the intermediate waveguide is formed by a part of the cladding having a cantilever-like structure.

The cantilever-like structure can be formed through limiting the lateral distance that the cladding surrounds the first waveguide, at least at a dedicated coupling area. The dedicated coupling area is the area in the waveguide structure, which includes the two tapered waveguide ends, and where the light is actually transferred in use from the first waveguide to the second waveguide. In addition the substrate is removed in the dedicated coupling area to prevent light leaking from the cladding to the substrate.

With the cantilever-like structure, low loss adiabatic coupling between the two waveguides can be well implemented.

In a third implementation form of the waveguide structure according to the second implementation form of the first aspect, the tapered end of the first waveguide is embedded in the cantilever-like structure.

As a consequence, light can be adiabatically coupled into the intermediate waveguide with very low loss.

In a fourth implementation form of the waveguide structure according to the second or third implementation forms of the first aspect, at least a part of the cantilever-like structure is arranged between the tapered ends of the first and second waveguides, respectively, and is embedded in a material, preferably a polymer material, of lower refractive index than the cladding.

The polymer material, which is provided, for instance, below the cantilever-like structure, replaces the removed substrate thereby avoiding light loss to a substrate on which the waveguide structure may be formed.

In a fifth implementation form of the waveguide structure according to the first aspect as such or according the first implementation form of the first aspect, the intermediate waveguide is formed by a filled trench in the cladding, wherein the trench filling material is of higher refractive index than the cladding but lower refractive index than the first and second waveguides.

This approach avoids the need to provide a low refractive index material beneath the cladding to avoid light loss to a substrate. Since the cladding should be of lower refractive index than the trench filling material, light loss to the substrate is inherently avoided.

In a sixth implementation form of the waveguide structure according to the fifth implementation form of the first aspect, the cladding comprises a lower cladding layer and an upper cladding layer, which cladding layers sandwich the first waveguide, and the filled trench is provided completely in the upper cladding layer and is arranged between the tapered ends of the first and second waveguides, respectively.

Thus, only the upper cladding layer needs to be structured with the trench, which results in faster processing and higher yields.

In a seventh implementation form of the waveguide structure according to the first aspect as such or according to any of the previous implementation forms of the first aspect, the second waveguide and/or the first waveguide has a refractive index of 1.8 or higher, and the cladding has a refractive index of 1.5 or lower.

Consequently, at least the first waveguide, but preferably also the second waveguide, is a medium or high index contrast waveguide, i.e. with a high index contrast between waveguide and cladding.

In an eight implementation form of the waveguide structure according to the first aspect as such or according to any of the previous implementation forms of the first aspect, the tapered ends of the first and second waveguides taper from a width of about 0.4-1 μm to a width of about 0.1-0.2 μm over a length of about 200-800 μm.

Such tapered ends enable adiabatic coupling with particularly low optical coupling losses.

In a ninth implementation form of the waveguide structure according to the first aspect as such or according to any of the previous implementation forms of the first aspect, the intermediate waveguide has a width of about 2 μm-4 μm, and/or the first and second waveguides each have a width of about 0.2-1 μm and a thickness of about 0.05-0.4 μm, and/or a distance between the first waveguide and the second waveguide is about 2-4 μm, preferably about 3 μm.

Such waveguide structures enable a good light transmission performance, and optical coupling between the waveguides with low optical loss.

In a tenth implementation form of the waveguide structure according to the first aspect as such or according to any of the previous implementation forms of the first aspect, the second waveguide and/or the first waveguide are made of silicon nitride.

Silicon nitride enables significantly improved performance, in particular for telecom applications, and is furthermore fully compatible with CMOS processing.

In an eleventh implementation form of the waveguide structure according to the first aspect as such or according to any of the previous implementation forms of the first aspect, the first and second waveguides belong to one chip, and the second waveguide is provided close to or on the surface of the chip.

In this way, light can be brought from the inside of a chip to the chip surface. The light is mainly guided within the chip in the first waveguide. Thus, the light transmission performance of the chip is improved. Further, apart from a dedicated coupling area, the chip surface can be made more planar and can be used for structuring or coupling of other devices, e.g. passive or active devices or even other chips. By bringing the light to the chip surface, the light can nevertheless be coupled out of the chip more easily. For example, the light can be coupled to a second chip, which may be attached to the first chip by flip-chip technique or by transfer printing technique. The light can also be coupled to any other suitable object that has at least one waveguide. For instance, the light could be coupled easily from the chip to a waveguide designed to optically connect the chip to some point some distance away e.g., a polymer waveguide or optical fiber with cladding removed.

In a twelfth implementation form of the waveguide structure according to the first aspect as such or according to any of the first to tenth implementation forms of the first aspect the first waveguide belongs to a first chip, and the second waveguide belongs to a second chip, which second chip is transfer printed onto the first chip.

Thereby, low-loss optical chip-to-chip coupling is achieved in most a direct manner. Instead of using transfer printing, the second chip may also be provided to the first chip by other suitable techniques, for instance by flip chip.

A second aspect of the present invention provides as chip including a waveguide structure according to the first aspect as such or according to any implementation forms of the first aspect for optically coupling the chip to an object including at least one waveguide, for instance another chip.

Thus, the second aspect presents a chip, which enables low-loss optical chip-to-chip coupling. For instance, a second similar or identical chip may be inverted and properly aligned and attached to the first chip. Any gap between the two chips is preferably filled with a refractive material similar or identical to that of the cladding layers. Alternatively, the object including at least one waveguide may be a polymer waveguide.

A third aspect of the present invention provides a method of fabricating a waveguide structure for optical coupling, comprising the steps of forming a first waveguide with a tapered end, embedding the first waveguide in a cladding of lower refractive index than the first waveguide, forming, in a distance to the first waveguide, a second waveguide with a tapered end, forming an intermediate waveguide, wherein at least a part of the intermediate waveguide is formed between the first waveguide and the second waveguide, wherein the tapered ends of the first and second waveguides are each designed for coupling light into and/or out of the intermediate waveguide.

In a first implementation form of the method of the third aspect, the intermediate waveguide is formed by or in a part of the cladding.

In a second implementation form of the method according to the third aspect as such or according to the first implementation form of the third aspect, the intermediate waveguide is formed by a part of the cladding having a cantilever-like structure.

In a third implementation form of the method according to the second implementation form of the third aspect, the tapered end of the first waveguide is embedded in the cantilever-like structure.

In a fourth implementation form of the method according to the second or third implementation forms of the third aspect, at least a part of the cantilever-like structure is arranged between the tapered ends of the first and second waveguides, respectively, and is embedded in a material, preferably a polymer material, of lower refractive index than the cladding.

In a fifth implementation form of the method according to the third aspect as such or according the first implementation form of the third aspect, the intermediate waveguide is formed by a filled trench in the cladding, wherein the trench filling material is of higher refractive index than the cladding but lower refractive index than the first and second waveguides.

In a sixth implementation form of the method according to the fifth implementation form of the third aspect, the cladding comprises a lower cladding layer and an upper cladding layer, which cladding layers sandwich the first waveguide, and the filled trench is provided completely in the upper cladding layer and is arranged between the tapered ends of the first and second waveguides, respectively.

In a seventh implementation form of the method according to the third aspect as such or according to any of the previous implementation forms of the third aspect, the second waveguide and/or the first waveguide has a refractive index of 1.8 or higher, and the cladding has a refractive index of 1.5 or lower.

In an eighth implementation form of the method according to the third aspect as such or according to any of the previous implementation forms of the third aspect, the tapered ends of the first and second waveguides taper from a width of about 0.4-1 μm to a width of about 0.1-0.2 μm over a length of about 200-800 μm.

In a ninth implementation form of the method according to the third aspect as such or according to any of the previous implementation forms of the third aspect, the intermediate waveguide has a width of about 2 μm-4 μm, and/or the first and second waveguides each have a width of about 0.2-1 μm and a thickness of about 0.05-0.4 μm, and/or a distance between the first waveguide and the second waveguide is about 2-4 μm, preferably about 3 μm.

In a tenth implementation form of the method according to the third aspect as such or according to any of the previous implementation forms of the third aspect, the second waveguide and/or the first waveguide are made of silicon nitride.

In an eleventh implementation form of the method according to the third aspect as such or according to any of the previous implementation forms of the third aspect, the first and second waveguides belong to one chip, and the second waveguide is provided close to or on the surface of the chip.

In a twelfth implementation form of the method according to the third aspect as such or according to any of the first to tenth implementation forms of the third aspect the first waveguide belongs to a first chip, and the second waveguide belongs to a second chip, which second chip is transfer printed onto the first chip.

The method according to the third aspect, and its implementation forms, achieves the same advantages and technical effects than the waveguide structure of the first aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present invention will be explained in the following description of specific embodiments in relation to the enclosed drawings, in which.

DETAILED DESCRIPTION

Figure 1:
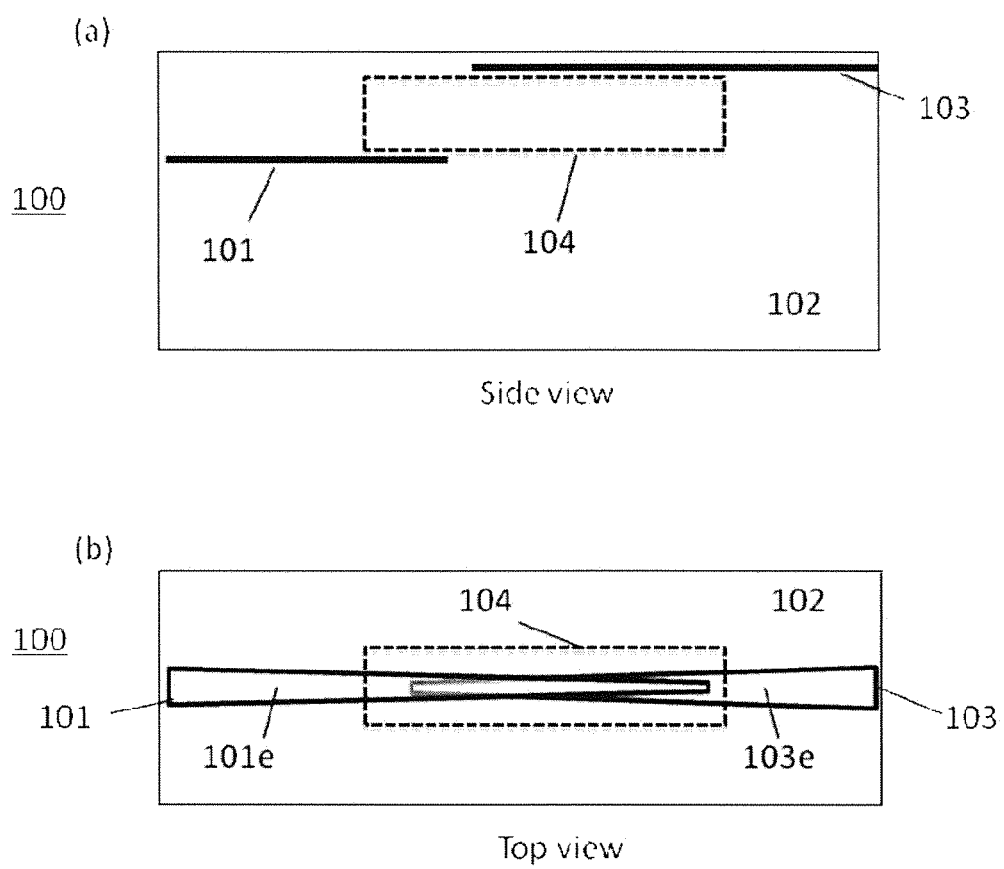
FIG. 1 shows a waveguide structure according to a basic embodiment of the present invention.

FIG. 1 shows a waveguide structure 100 according to a basic embodiment of the present invention. In particular, FIG. 1 shows in (a) a side view of the waveguide structure 100, and in (b) a top view of the same waveguide structure 100. The waveguide structure 100 includes a first waveguide 101, which is embedded in a cladding 102. The cladding 102 is made of a material that has a lower refractive index than the material of the first waveguide 101. The material of the first waveguide 101 is, for example, SiN or Si. The material of the cladding 102 is, for example, SiO2. The cladding 102 may be a single cladding layer, or may consist of several cladding layers, for instance a lower cladding layer and an upper cladding layer sandwiching the first waveguide 101. The cladding 102 may be provided on a substrate, for instance, a silicon substrate.

The waveguide structure 100 also includes a second waveguide 103. The second waveguide 103 is distanced form the first waveguide 101, preferably in a direction perpendicular to its extension direction. Preferably, the two waveguides 101 and 103 have the same extension direction and are also substantially parallel to another. The second waveguide 103 may be embedded in the cladding 102 or may be provided on top of the cladding 103. The second waveguide 103 is made of a material that has a higher refractive index than the material of the cladding 102. Its refractive index may further be the same or different (either lower or higher) than the refractive index of the first waveguide 101. The second waveguide 103 may, for example, be made of SiN or Si. Preferably, the second waveguide material and/or the first waveguide material have a refractive index of 1.8 or higher, while the cladding material has a refractive index of 1.5 or lower. That means, preferably the first waveguide 101 and the second waveguide 103 are of a medium or high index contrast with respect to the cladding 102.

The waveguide structure 100 includes further an intermediate waveguide 104 (dashed line in FIG. 1), which is arranged at least partly between the first waveguide 101 and the second waveguide 103. The intermediate waveguide 104 is, for instance, formed by a part of the cladding 102, or is, for instance, formed within a part of the cladding 102. The intermediate waveguide 104 is designed and adapted to transfer light from the first waveguide 101 to the second waveguide 103.

To this end, as can be seen in (b) of FIG. 1, both the first waveguide 101 and the second waveguide 103 comprise a tapered end 101e and 103e, respectively. These tapered ends 101e and 103e are adapted to exchange light with the intermediate waveguide 104, i.e., are designed for coupling light, preferably adiabatically, into and/or out of the intermediate waveguide 104. Accordingly, light can be transferred with very low losses of <1 dB between the first waveguide 101 and the second waveguide 103 via the intermediate waveguide 104.

As is shown in FIG. 1, the two waveguides 101 and 103 may have a common extension direction. The intermediate waveguide 104 and the tapered ends 101e and 104e are then particularly designed to transfer light between the first waveguide 101 and the second waveguide 103 over a transition length in extension direction of the waveguides 101 and 103 of about 500 μm or less. To this end, preferably the tapered ends 101e and 103e overlap in extension direction of the waveguides 101 and 103 (i.e., when viewed from the top, see (b) of FIG. 1) by 500 μm or less, preferably by about 400 μm or less, more preferably by about 300 μm or less.

Figure 2:
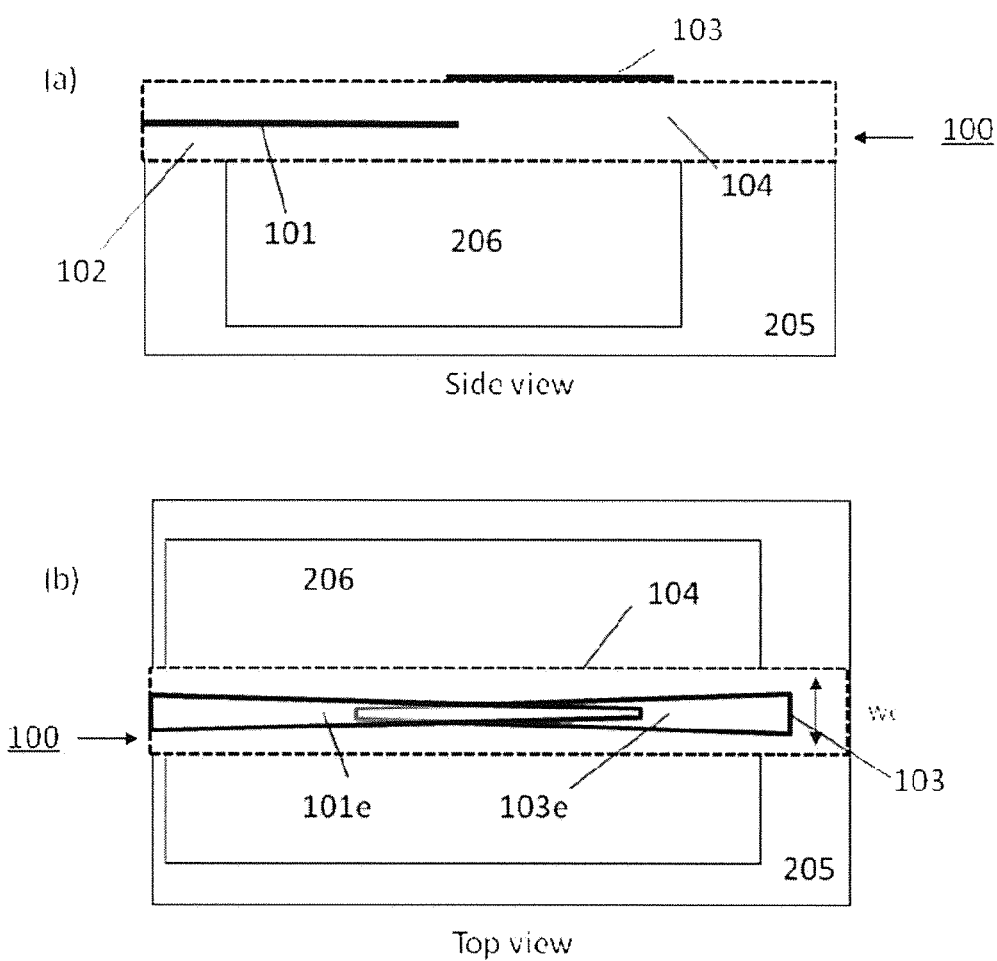
FIG. 2 shows, in a chip, a waveguide structure according to a first specific embodiment of the present invention.

FIG. 2 shows a first specific embodiment of the present invention, which builds on the basic embodiment shown in FIG. 1. The embodiment shown in FIG. 2 uses a "cantilever coupler", meaning that the intermediate waveguide 104 (dashed line in FIG. 2) is formed by a part of the cladding 102 that has a cantilever-like structure. Preferably, the second waveguide 103 is further a surface waveguide, as shown in FIG. 2. The waveguide structure 100 may be provided on a substrate 205, as shown is for this embodiment.

The cantilever-like structure of the intermediate waveguide 104 can be well seen in (b) of FIG. 2. The cantilever-like structure can be formed through limiting the lateral distance in which the cladding 102 surrounds the first waveguide 101, i.e., by removing part of the cladding 102 lateral to the first waveguide 101, at least at a dedicated coupling area. In particular, the cladding 102 surrounding the first waveguide 101 at the dedicated coupling area is narrowed down to a width Wc of preferably 1-5 μm, more preferably 3 μm, as is indicated in FIG. 2 (b).

The tapered end 101e of the first waveguide 101 may be embedded in the cantilever-like structure, as shown in FIG. 2. The tapered end 101e further overlaps—when viewed from the top —with the tapered end 103e of the second waveguide 103. The second waveguide 103 is provided on the surface or close to the surface of the cantilever-like structure of the cladding 102. At least a part of the cantilever-like structure is thus arranged between the two tapered ends 101e and 103e, respectively. Additionally, in a certain region (at the reference sign 206 in FIG. 2) the substrate may be removed to avoid light leaking from the intermediate waveguide 104 to the substrate 205.

The cantilever-like structure is preferably at least partly embedded into or surrounded by a material 206 of lower refractive index than the cladding 102, preferably a polymer material, as shown in FIG. 2. This material 206 particularly replaces the substrate and the cladding, which have been removed around the intermediate waveguide, and helps to planarise the wafer.

In use of the waveguide structure 100 of the first specific embodiment, light is first coupled from the first waveguide 101, e.g., a silicon or medium index contrast waveguide, to the cantilever-like intermediate waveguide 104 formed by the cladding 102. Light can then further be coupled into the second waveguide 103, e.g., a thin medium or high index contrast waveguide on the wafer surface.

Figure 3:
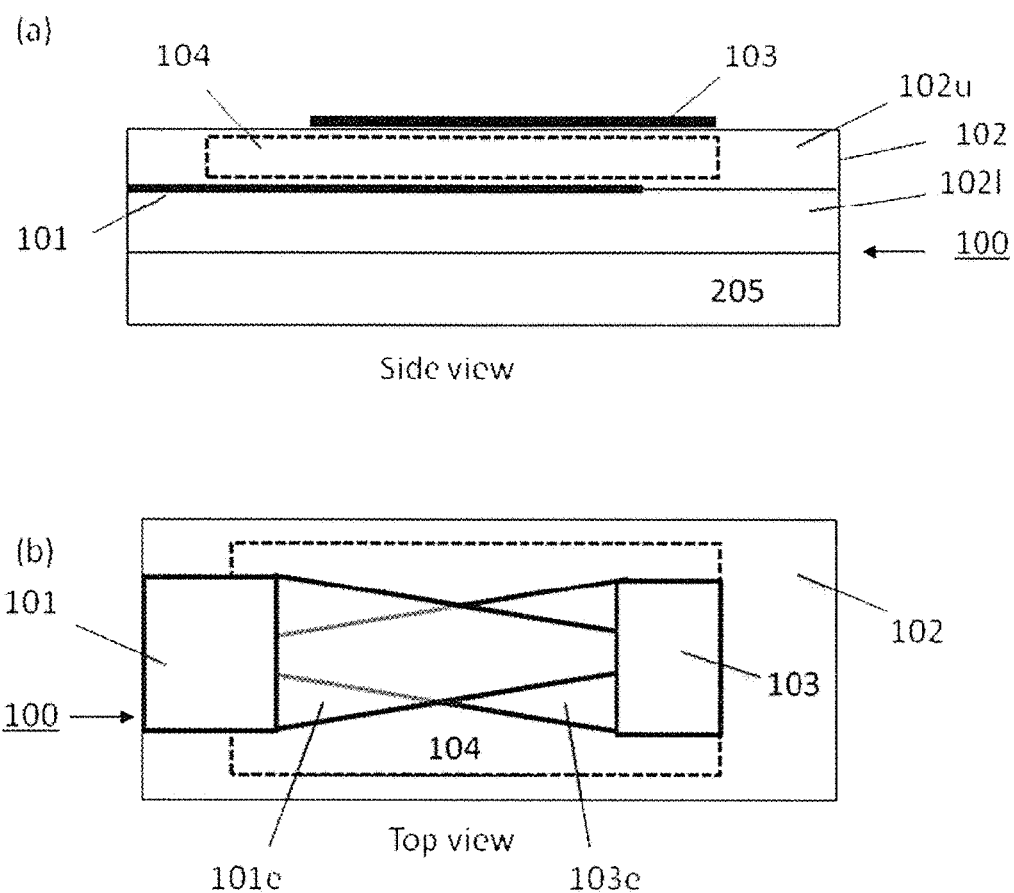
FIG. 3 shows, in a chip, a waveguide structure according to a second specific embodiment of the present invention.

FIG. 3 shows a second specific embodiment of the present invention, which builds on the basic embodiment shown in FIG. 1. The embodiment uses a 'back end open', meaning a trench is opened in the latter part or 'back end' of the process flow. The trench is then filled with an appropriate material. Consequently the intermediate waveguide 104 (dashed line in FIG. 3) is formed in a part of the cladding 102, namely by a filled trench. Preferably, the second waveguide 103 is a surface waveguide, as shown in FIG. 3 (a). The waveguide structure may be provided on a substrate 205, as shown in FIG. 3 (a) for this embodiment.

Towards the end of the manufacturing process of the waveguide structure 100, the cladding 102 is partly removed in the dedicated coupling area to form a trench. Preferably, the cladding 102 comprises a lower cladding layer 102l and an upper cladding layer 102u, which cladding layers 102l and 102u sandwich the first waveguide 101, and the trench is provided mainly (or completely as shown in FIG. 3) in the upper cladding layer 102u. The trench is further preferably arranged at least partly between the tapered ends 101e and 103e of the first and second waveguides 101 and 103, respectively. In particular, the upper cladding layer 102u is partly removed, exposing the core material of the first waveguide 101, e.g., a silicon or medium index contrast waveguide core. An etch step to remove the upper cladding layer 102u may be carried out, wherein an etch stop layer is previously deposited just above the first waveguide 101. After stopping the etching on this layer, the etch stop layer is itself removed.

The trench is then filled with a material having a refractive index somewhat higher than the cladding 102 (e.g., SiON or a polymer). Then the second waveguide 103 is defined, e.g., as a thin surface waveguide. In the final structure, the intermediate waveguide 104 is accordingly formed through the filled trench provided in the cladding 102. The trench filling material is of higher refractive index than the cladding 102, but is of lower refractive index than the first and second waveguides 101 and 103, respectively.

In use of the waveguide structure 100 of the second specific embodiment, light is transferred via the intermediate waveguide 104 to the second waveguide 103. The approach described for this embodiment avoids the need to remove the substrate 205 under the cladding 102, for instance, at the dedicated coupling area. However, preferably the intermediate waveguide 104 has a refractive index, which is high enough to prevent light loss to the substrate 205.

Figure 4:
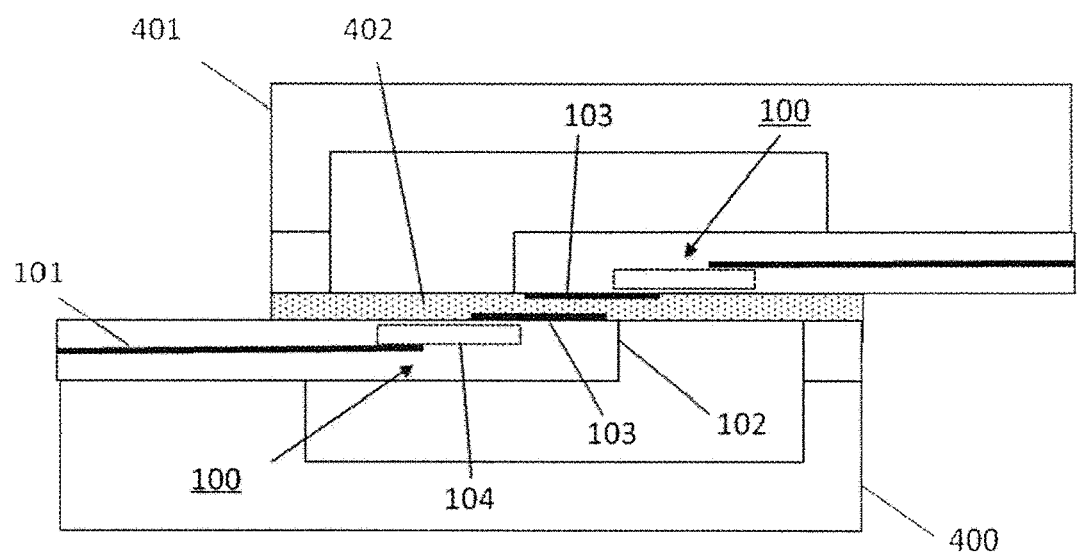
FIG. 4 shows optical chip-to-chip coupling between two chips having both a waveguide structure according to a first specific embodiment of the present invention.

FIG. 4 shows an exemplary use of waveguide structure 100 according to the first specific embodiment for chip-to-chip coupling. However, the waveguide structure 100 according to the second specific embodiment can be used in the same way.

The waveguide structure 100 including the first waveguide 101, the second waveguide 103, and the intermediate waveguide 104 (dashed line in FIG. 4) is in this case part of a first chip 400. The second waveguide 103 is provided on the chip surface, while the first waveguide 101 is embedded in the chip 400. That is, the waveguide structure 100 functions to bring light via the intermediate waveguide 104 to the chip surface. Chip-to-chip coupling can then be realized by inverting another similar or identical chip 401 and by properly aligning the second waveguides 103 on the respective chip surfaces.

Both chips 400 and 401 can be identical, or can be made from a different material system. For example, the first chip 400 may base on Si and SiN, while the second chip 401 uses a III-V material system, like GaAs. Any gap between the two chips 400 and 401 is preferably filled with a material 402 having a refractive index similar to the cladding 102. For example, if the cladding 102 of the chip 400 is SiO2, the refractive index of said material 402 should be about 1.445.

Figure 5:
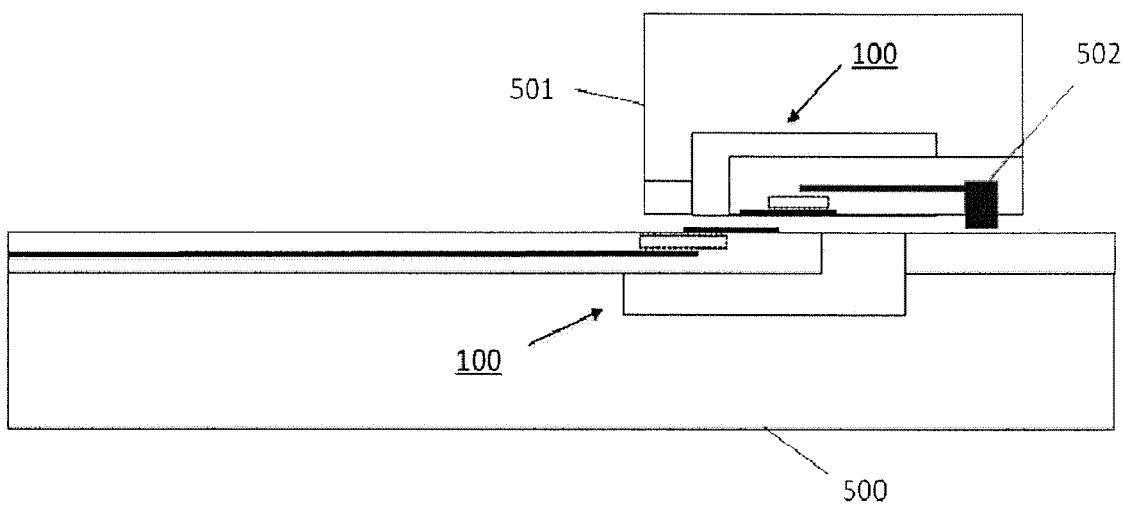
FIG. 5 shows an application scenario for a waveguide structure according to the first specific embodiment of the present invention.

FIG. 5 shows another specific application for chip-to-chip coupling, illustrated exemplarily for the waveguide structure 100 according to the first specific embodiment. The application involves a first chip 500 including the waveguide structure 100 and one or more passive devices fabricated, for example, by using high quality SiN waveguides. Such passive devices have far superior performance to those fabricated using silicon waveguides. That is, the first chip 500 can be referred to a SiN PIC.

Rather than monolithically integrating the first chip 500 with one or more active devices (in either the SOI or a III-V material system), one or more active devices may be integrated with the first chip 500 by using chip-to-chip coupling, which is enabled by the waveguide structure 100 of the present invention.

In particular, the active device shown in FIG. 5 is a waveguide detector 502. Waveguide detectors are essential to reach >30 GHz. For instance, Ge waveguide detectors fabricated on SOI can easily attain the required bandwidth. The waveguide structure 100 of the present invention provides a simple possibility to low-loss couple such a waveguide detector 502 to the first chip 500 (i.e., the SiN PIC). To this end, the waveguide detector 502 is embedded in a second object or chip 501 that includes a similar waveguide structure 100 as the first chip 500. By coupling the waveguide structures 100, the waveguide detector 502 can be coupled to the first chip 500.

Standard flip-chip techniques can be used for attaching and coupling the two chips 500 and 501. A similar approach is valid for modulators or other active devices.

Figure 6:
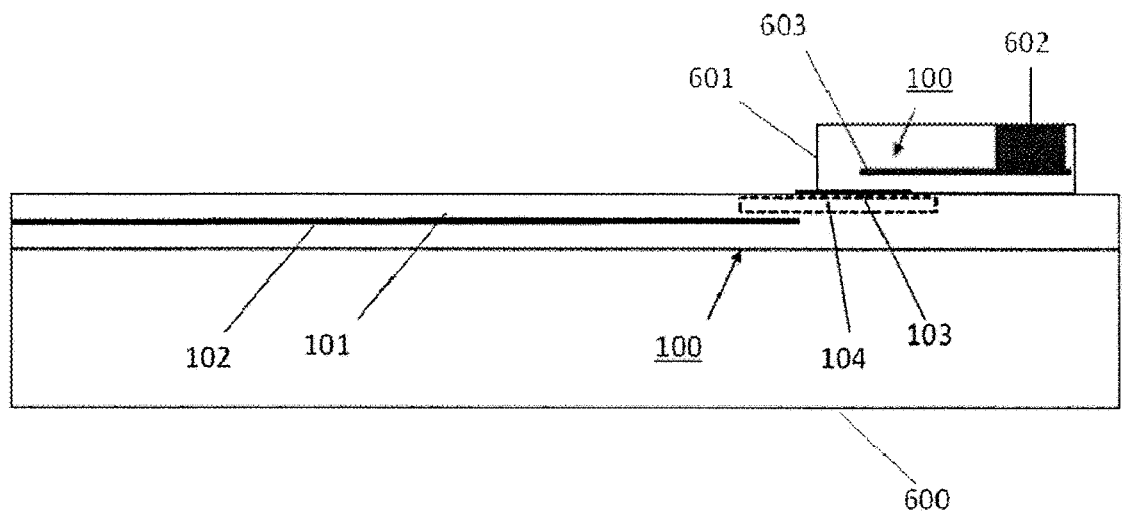
FIG. 6 shows an application scenario for a waveguide structure according to the second specific embodiment of the present invention.

FIG. 6 shows another specific application for chip-to-chip coupling, illustrated exemplarily for the waveguide structure 100 according to the second specific embodiment. Instead of flip-chip, transfer printing is used for this application.

In particular, a transfer printed layer 601 containing a detector 602 or a detector array, for instance, a Ge waveguide detector, is provided to a first chip 600. The first chip 600 may again be a SiN PIC. The transfer printed layer 601 includes at least one waveguide 603 that is coupled to the waveguide structure 100 of the first chip 600.

Transfer printing can be used particularly well for SOI active devices. For such SOI active devices, once the SOI processing is complete, transfer-printing techniques can release the top surface layers from the original silicon substrate and underclad oxide. The released layer may include any active device (e.g., a detector, a laser, a modulator or a heater). This layer can then be transferred to an object or second chip 601 that is provided with at least one waveguide 603 for coupling it to the waveguide structure 100 of the first chip 600.

It is noted that for the first chip 600 shown in FIG. 6, the second waveguide 103 provided above the intermediate waveguide 104 (dashed line in FIG. 6) on the chip surface is actually optional, as light can be coupled directly from the intermediate waveguide 104 (in this example the intermediate waveguide 104 formed by the trench fill) to the waveguide 603 of the second chip 601, which is transfer printed to the first chip 600. In this case, a waveguide structure 100 of the present invention would actually span two chips 600 and 602. That is, the waveguide structure 100 would include a first waveguide 101 and the intermediate waveguide 104 belonging to the first chip 600, and a second waveguide 603 belonging to the second chip 602, which second chip 602 is transfer printed onto the first chip 600.

Figure 7:
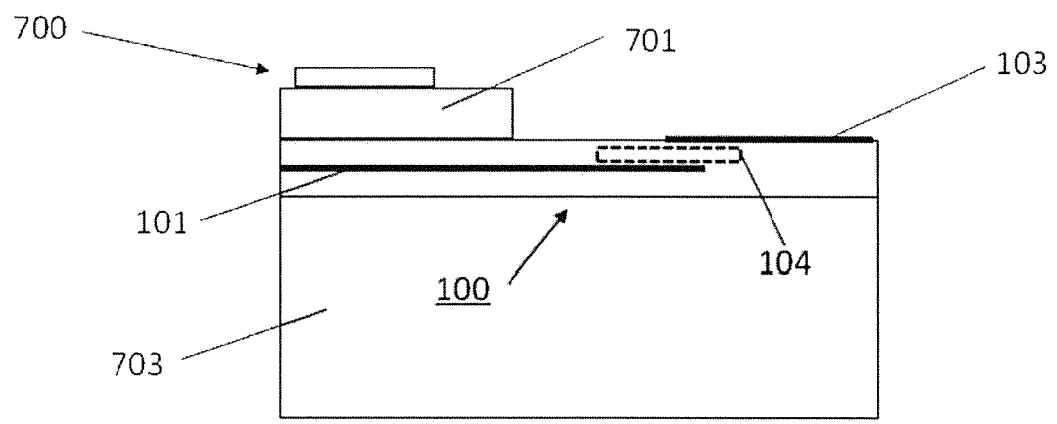
FIG. 7 shows an application scenario for a waveguide structure according to the first specific embodiment of the present invention.
Figure 8:
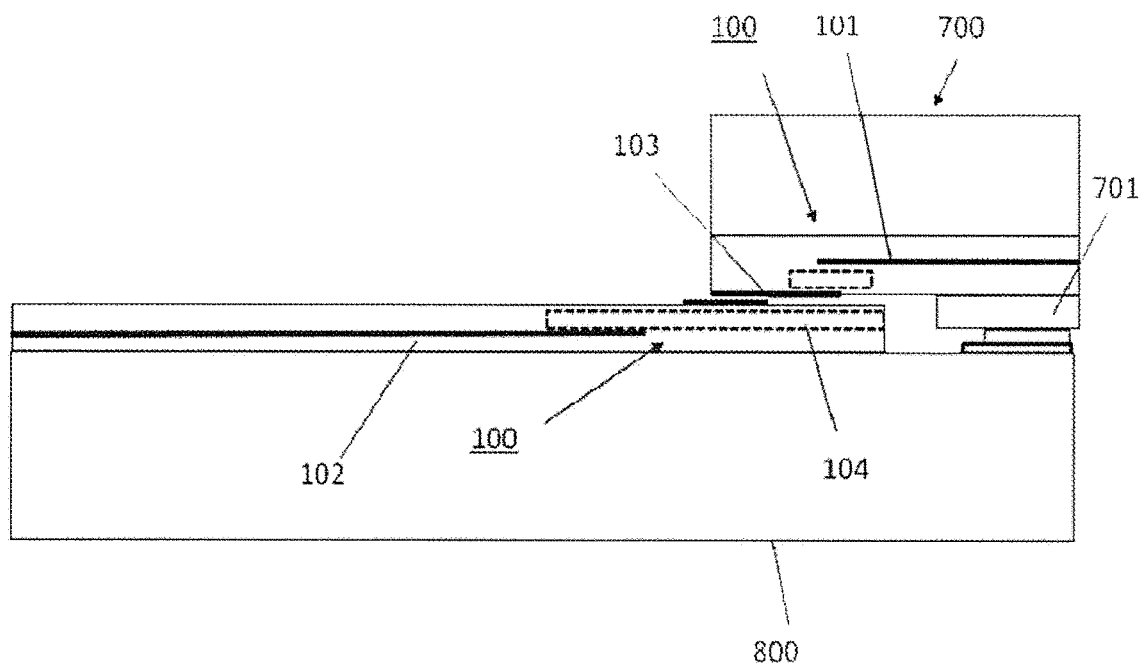
FIG. 8 shows an application scenario for a waveguide structure according to the second specific embodiment of the present invention.

FIGS. 7 and 8 show a specific example preferred for lasers. FIG. 7 shows a laser chip 700 with a monolithically integrated waveguide structure 100, including specifically a high index contrast first waveguide 101, an intermediate waveguide 104 (dashed line in FIG. 7), and a second waveguide 103. One method to create such a laser chip 700 is to use heterogeneous integration to form a laser device 701, or an array of lasers, on a silicon substrate 703. The waveguides 101 and 103 of the waveguide structure 100 are made of silicon or SiN.

As shown in FIG. 8, the waveguide structure 100 is used to transfer the light from the laser chip 700 to another chip 800, e.g., a SiN PIC, using flip-chip technique. The second waveguide 103 of the waveguide structure 100 in the laser chip 700 is optional, since light could be directly coupled from the first waveguide 101 of the laser chip 700 into the intermediate waveguide 104 (dashed line in FIG. 8) of the second chip 800. However, the use of the second waveguide 103 on the laser chip surface facilitates alignment between the two chips 700 and 800, and thus improves alignment tolerances. Furthermore, the allowed spacing between the two chips 700 and 800 is increased.

The cladding 102, e.g., silicon dioxide upper and lower cladding, of the second chip 800 is removed, where the laser chip 700 is to be flip-chip bonded. This provides an efficient thermal path to aid the cooling of the laser 701. In addition the substrate/cladding interface step provides a reference, which makes it easier to flip-chip the laser chip 700 or array of lasers at the correct height for the coupling of the two chips 700 and 800 to work efficiently.

The coupling losses, particularly when employing adiabatic coupling, produce fewer reflections than an alternative conventional butt coupling approach. The coupling approach presented in FIG. 8 is further compatible with non-hermetic environments.

In the following, simulation results for the waveguide structures and chip-to-chip coupling schemes described above are presented.

Figure 9:
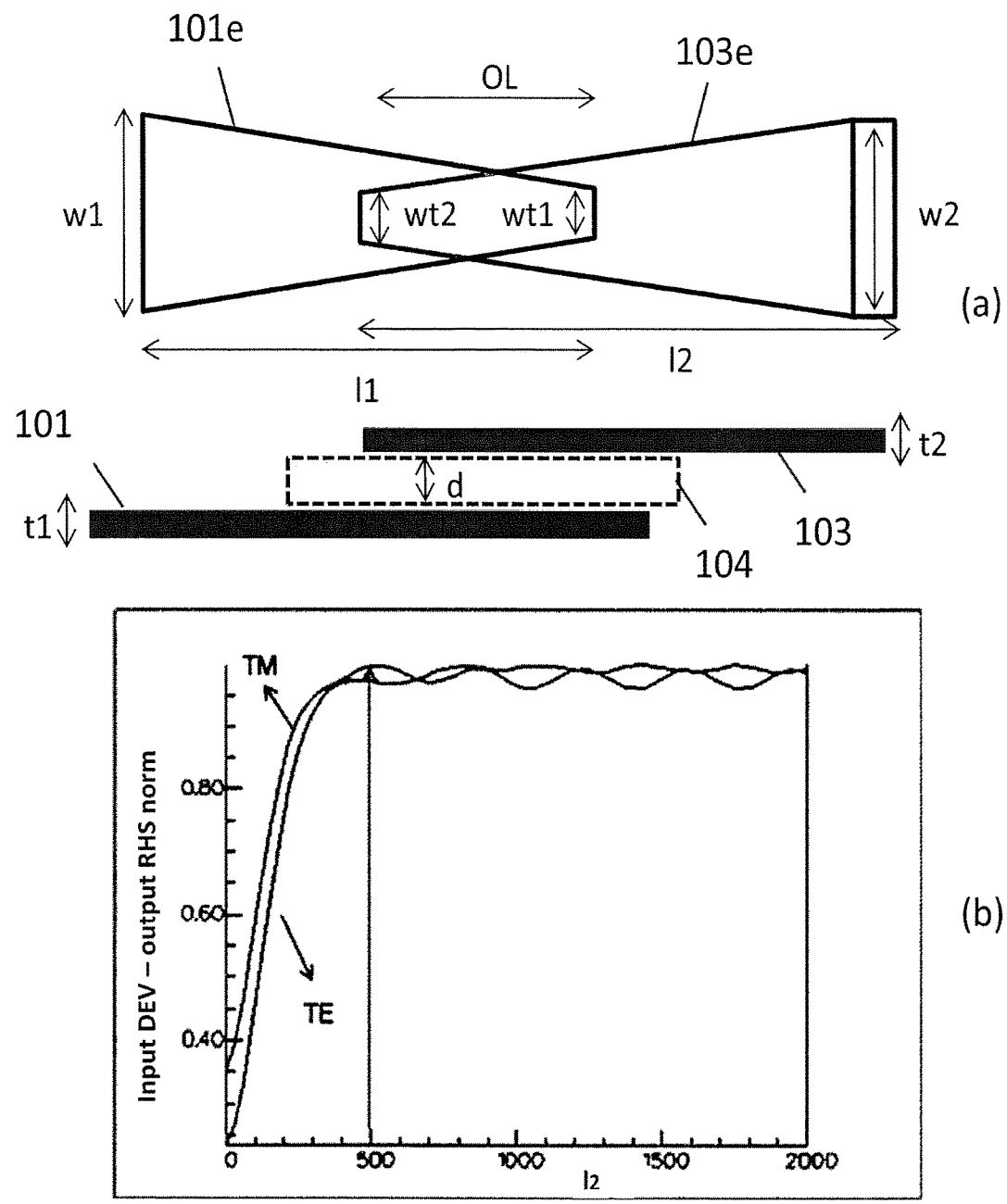
FIG. 9 shows simulation results of a waveguide structure according to the first specific embodiment of the present invention.

FIG. 9 shows simulation results for coupling in a waveguide structure 100 of the first specific embodiment, particularly coupling from a SiN first waveguide 101 to a second surface SiN waveguide 103 by means of a SiO2 cantilever-type intermediate waveguide 104 (dashed line in FIG. 9). The waveguide structure 100 is thus as shown in FIG. 2 and more specifically in FIG. 9 in (a).

That is, the first waveguide 101 is distanced from the second waveguide 103 by a distance d, which distance d corresponds accordingly to the thickness of the intermediate waveguide 104. The distance d is preferably about 2-4 µm, more preferably about 3 µm. The first waveguide 101 has a thickness t1, preferably in the range of 0.05-0.4 µm, and the second waveguide 103 has a thickness t2, preferably in the same range as t1. The tapered end 101e of the first waveguide 101 tapers from a waveguide width w1, preferably in the range of 0.4-1 µm, to a tapered end width wt1, preferably in the range of 0.1-0.2 µm. The tapering occurs (preferably linearly) over a length l1, which is preferably in a range of 200-800 µm. The tapered end 103e of the second waveguide 103 tapers from a waveguide width w2, preferably in the same range as w1, to a tapered end width wt2, preferably in the same range as wt1, and (preferably linearly) over a length l2, preferably in the same range as l1. The tapered ends 101e and 103e overlap over a length OL. The length OL is preferably 500 nm or less, even more preferably about 400 µm or less, most preferably about 300 µm or less.

The simulation results obtained are shown in FIG. 9 in (b). The x-axis indicates the transition length, over which the light is transferred (it shows the length of the overlap of the tapered ends 101e and 103e), and the y-axis shows the proportion (from 0 to 1, i.e., no light to all of the light) of light transferred (i.e., coupled between the two waveguides 101 and 103). The results demonstrate that both the TE and TM mode of the light can be efficiently transferred between the waveguides 101 and 103 with a transition length of about 500 µm.

Figure 10:
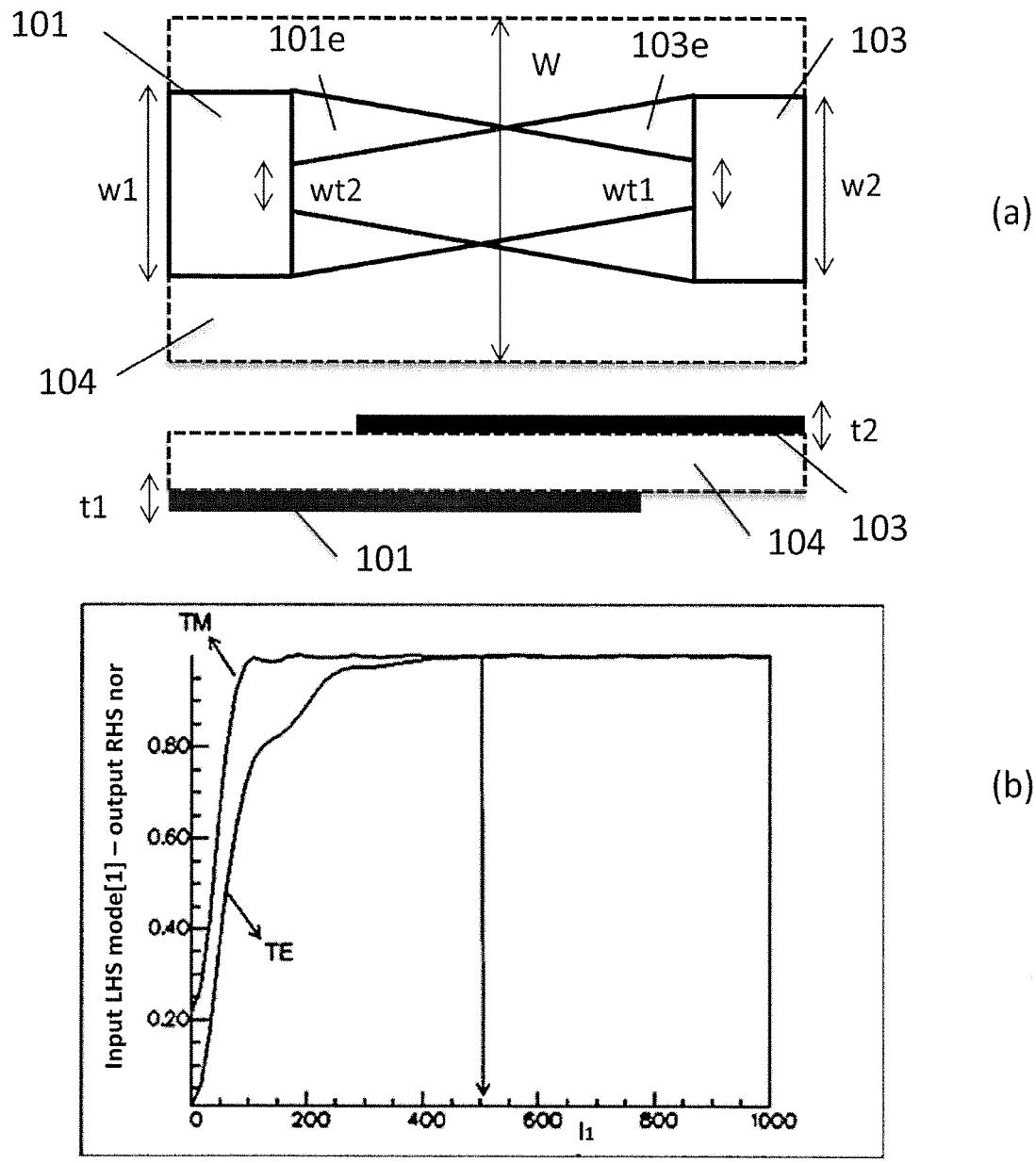
FIG. 10 shows simulation results of a waveguide structure according to the second specific embodiment of the present invention.

FIG. 10 shows simulation results for coupling in a waveguide structure 100 of the second specific embodiment, particularly coupling from a SiN first waveguide 101 to a second surface SiN waveguide 103 by means of a SiON trench intermediate waveguide 104 (dashed line in FIG. 10). The waveguide structure 100 is thus as shown in FIG. 3 and more specifically in FIG. 10 in (a).

That is, the first waveguide 101 is distanced from the second waveguide 102 by the filled trench having a refractive index of 1.5, and forming the intermediate waveguide 104. The first waveguide 101 has again a thickness of t1, and the second waveguide 103 has again a thickness of t2. The tapered end 101e of the first waveguide 101 tapers again from a waveguide width w1 to a tapered end width wt1. The tapered end 103e of the second waveguide 103 tapers again from a waveguide width w2 to a tapered end width wt2. The values of t1, t2, w1, wt1, w2 and wt2 are preferably in the same ranges as described above in relation to FIG. 9. The width of the filled trench intermediate waveguide 104 is denoted as W, and is preferably in the range of 2 µm-4 µm.

The results of the simulation are shown in FIG. 10 in (b), and demonstrate that both the TE and TM mode of the light are successfully transferred with very low loss with a transition length of about 500 µm.

In addition to transferring light from the first waveguide 101 to the second waveguide 103, chip-to-chip coupling also requires the transfer of light between the second (preferably surface) waveguides 103 of two different chips. Such a transfer has been simulated using the structure shown in FIG. 11 in (a).

Figure 11:
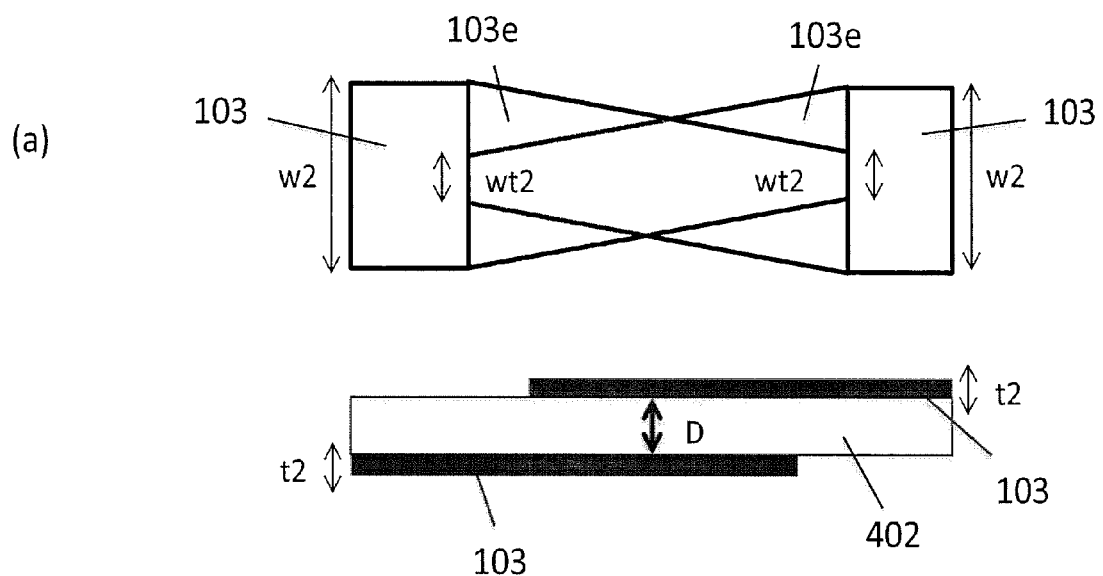
FIG. 11 shows simulation results of an optical chip-to-chip coupling scheme using flip-chip bonding and a waveguide structure according to an embodiment of the present invention.
Figure 11:
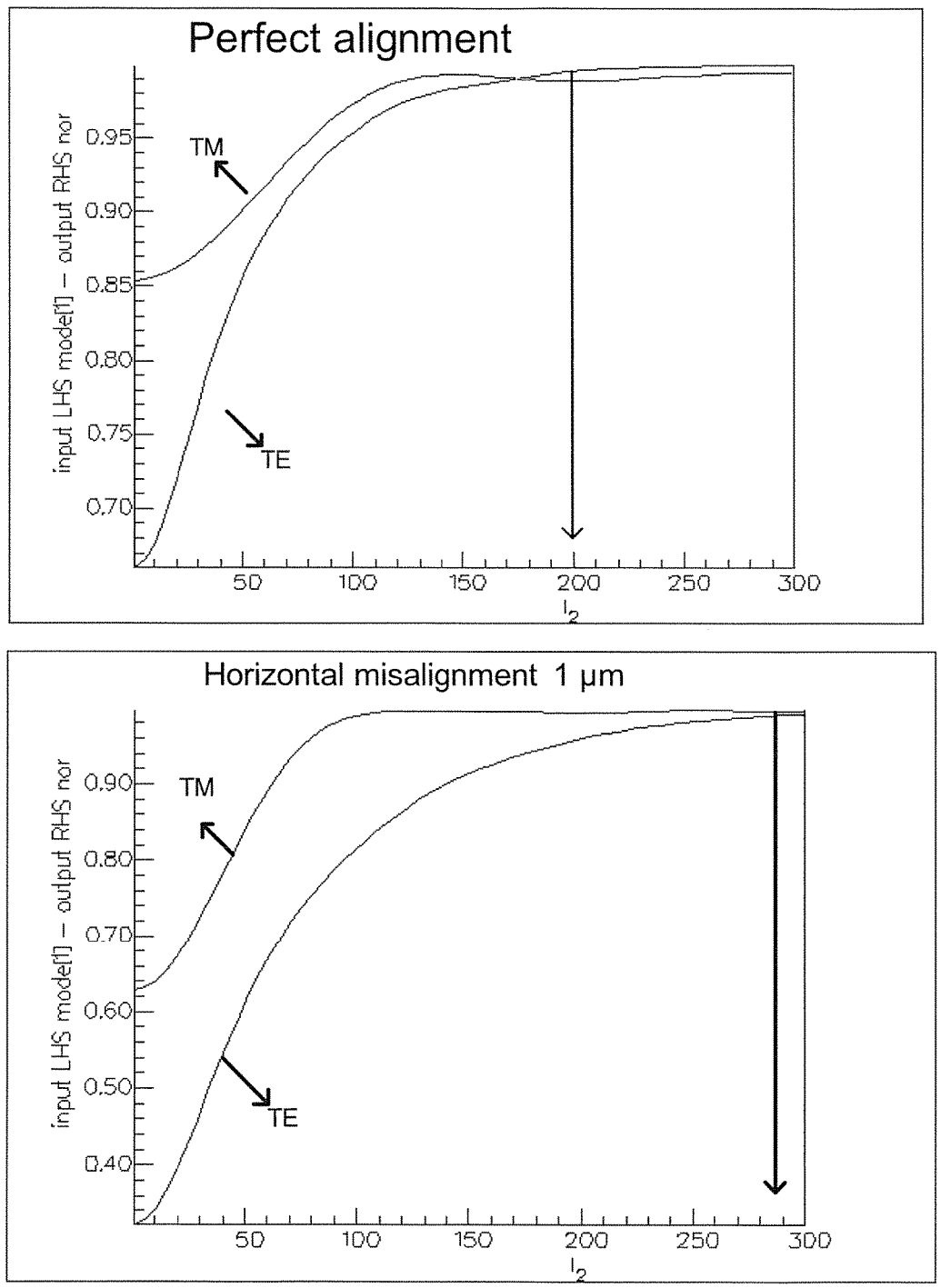

In particular, for transferring light from a first chip to a second chip, a gap between the two chips is preferably filled with a spacer material 402 (e.g., an epoxy) having a refractive index lower than the waveguides 103 of the chips (see also FIG. 4), e.g., a refractive index close to thermal oxide (when cured). FIG. 11 shows such coupling between two chips having each a SiN surface waveguide 103 and a SiO2 spacer 402 in between with a thickness D, which is e.g., chosen as 1 µm. The waveguides 103 both have a thickness of t2, and both have tapered ends 103e that taper from a waveguide width w2 to a tapered end width wt2. The values of t2, w2 and wt2 are preferably in the same ranges as described above in relation to FIG. 9. The spacer 402 acts as an intermediate waveguide 104 between the two waveguides 103, so that essentially the two waveguides 103 and an intermediate waveguide formed by the spacer 402 constitute together a waveguide structure 100 according to the present invention.

The results of the simulation are shown in FIG. 11 in (b). The results show that the light can be transferred with a transition length of only 200-300 µm depending on an alignment tolerance. That is, for a perfect alignment of the two chips —as shown on the left side in FIG. 11 (b)—a transition length of 200 µm is sufficient, while for a misalignment of 1 µm between the two chips, a transition length of 300 µm is sufficient.

Figure 12:
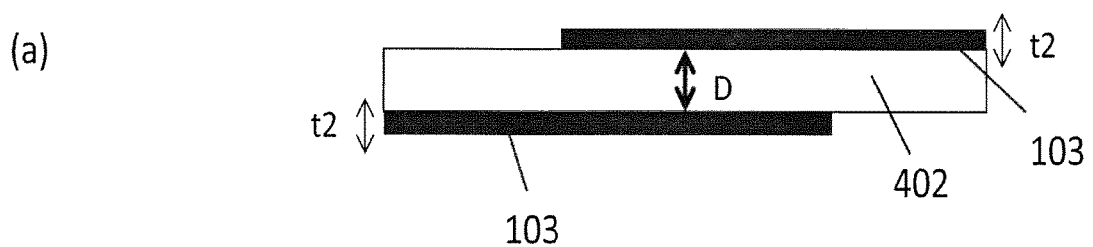
FIG. 12 shows simulation results of an optical chip-to-chip coupling scheme using flip-chip bonding and a waveguide structure according to an embodiment of the present invention.
Figure 12:
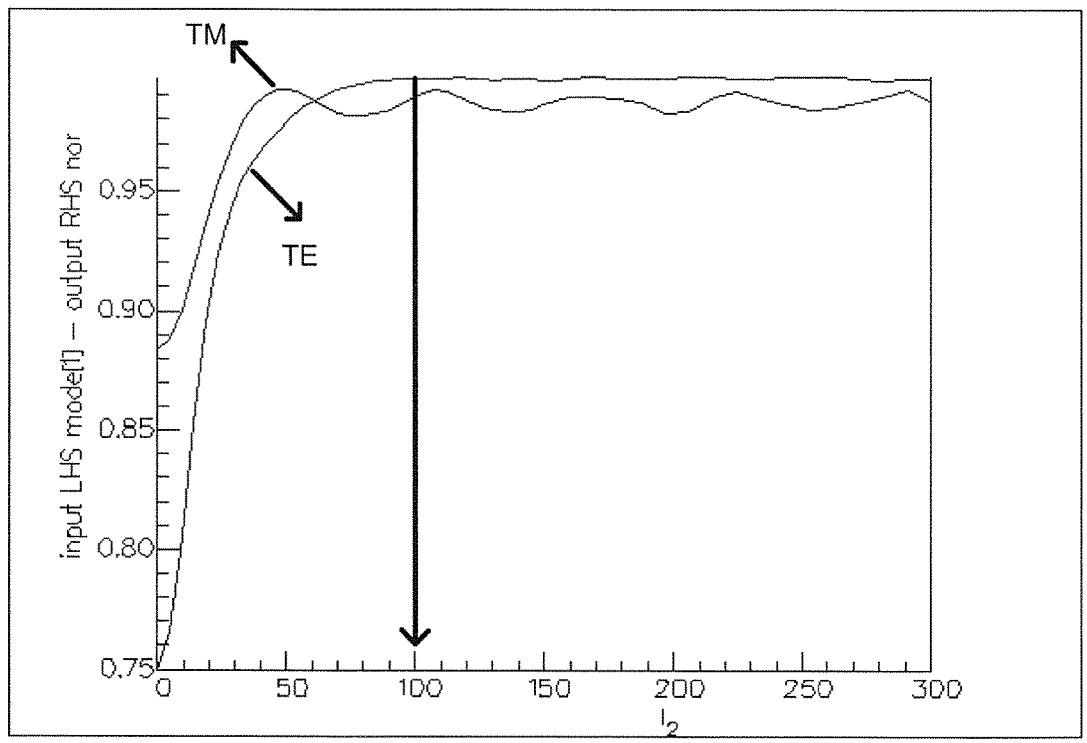
Figure 12:
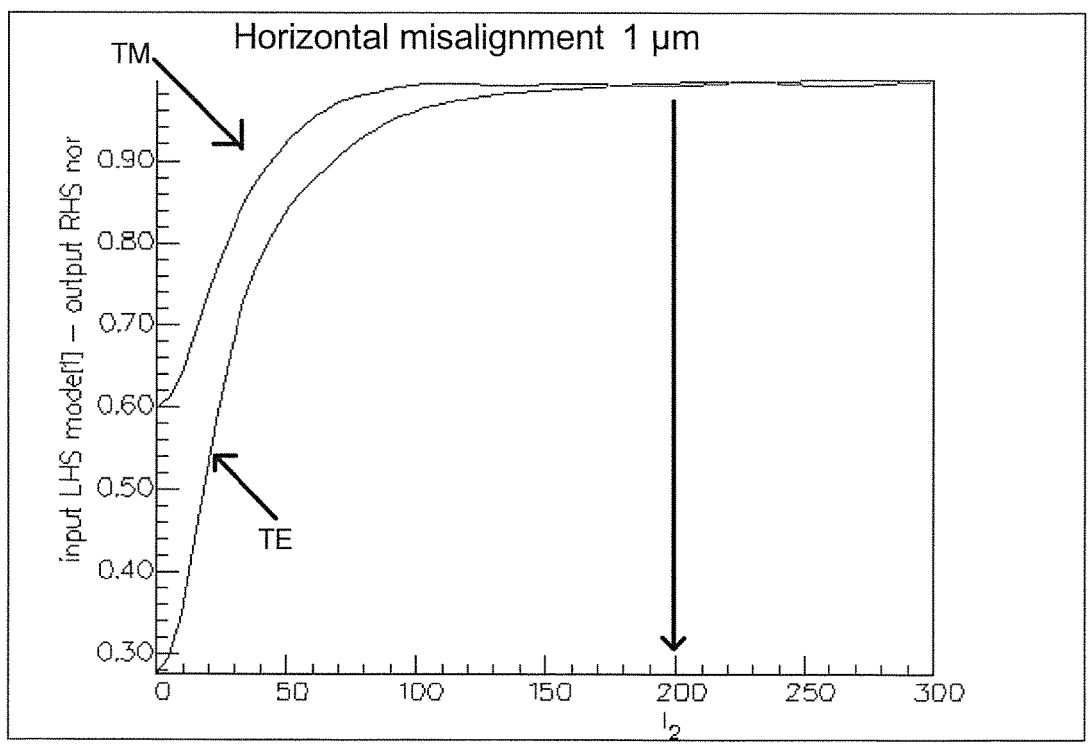

Similarly, it is shown in FIG. 12 that if the gap/spacer 402 between the two chips is reduced to a thickness D of e.g., 0.5 µm—as shown in the waveguide structure 100 in FIG. 12 in (a)—then the transition length may be less than 200 µm, even with a 1 µm misalignment between the chips—as shown in FIG. 12 in (b).

Figure 13A:
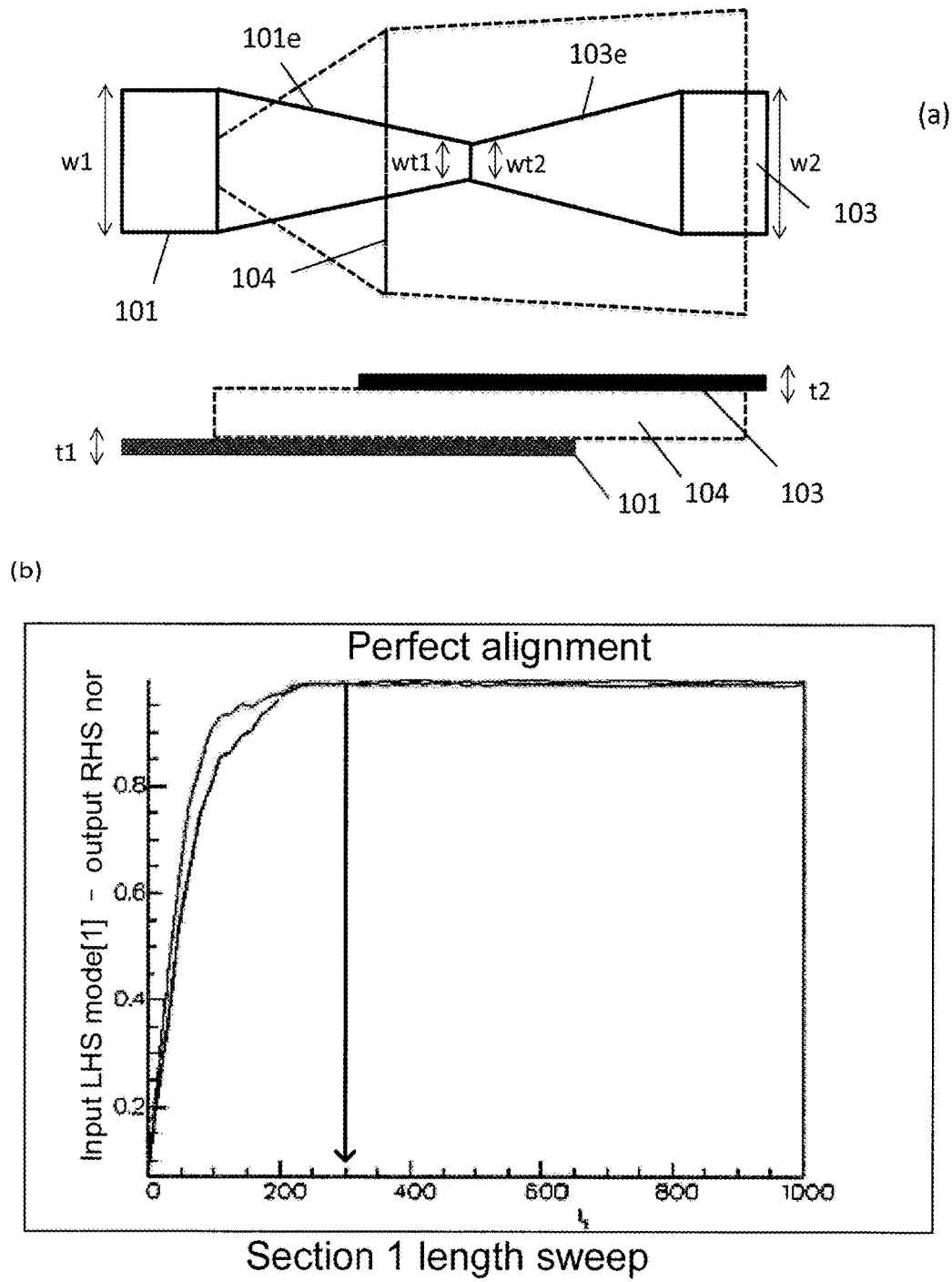
FIG. 13 shows simulation results of an optical chip-to-chip coupling scheme using flip-chip bonding and a waveguide structure according to an embodiment of the present invention.
Figure 13B:
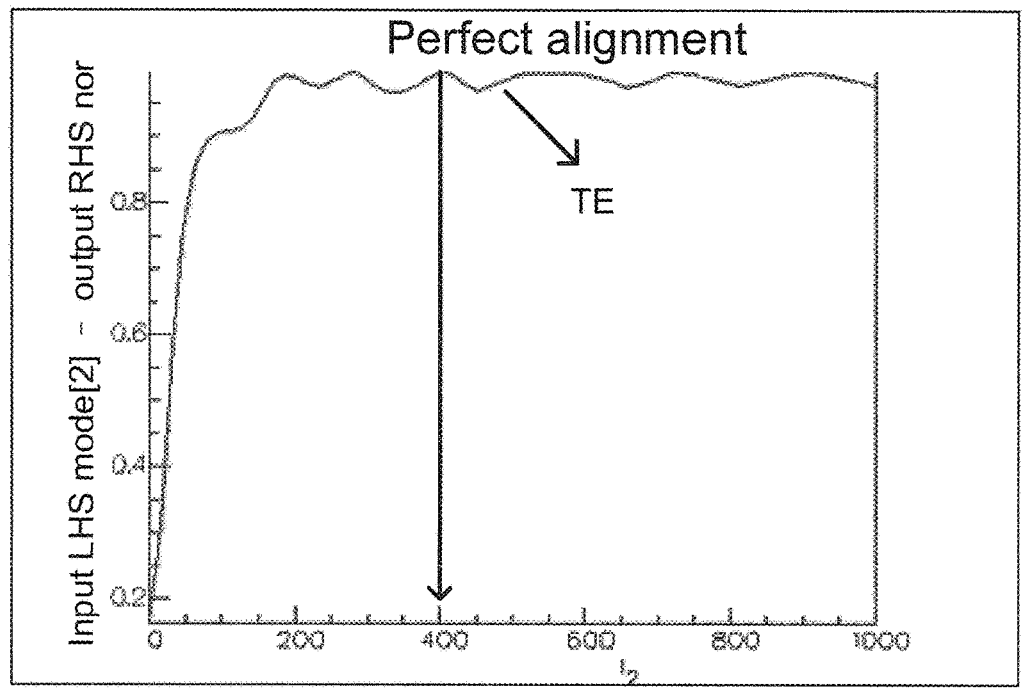
Figure 13B:
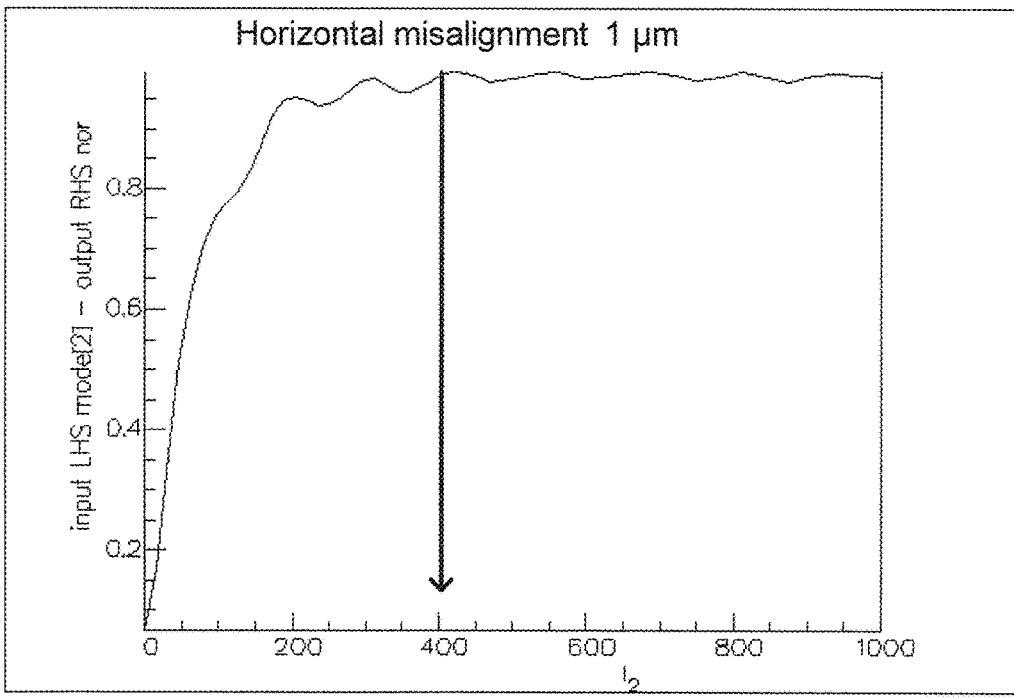

FIG. 13 shows simulation results for coupling in a waveguide structure 100 of the second specific embodiment, particularly coupling from a first SiN waveguide 101 to a second transfer printed silicon waveguide 103 by means of a SiON trench intermediate waveguide 104 (dashed line in FIG. 13). The waveguide structure 100 is thus as shown in FIG. 3 (but with the second waveguide 103 belonging to the transfer printed layers) and more specifically in FIG. 13 in (a).

That is, the first waveguide 101 is distanced from the second waveguide 103 by the filled trench having a refractive index of 1.55 and forming the intermediate waveguide 104. The first waveguide 101 has again a thickness t1, and the second waveguide 103 has again a thickness of t2. The tapered end 101e of the first waveguide 101 tapers from a waveguide width w1 to a tapered end width wt1, e.g., over a length l1. The tapered end 103e of the second waveguide 103 tapers from a waveguide width w2 to a tapered end width wt2 e.g. over a length l2. The values of t1, t2, w1, wt1, w2, wt2, l1 and l2 are preferably in the same ranges as described above in relation to FIG. 9.

It is noted that also the filled trench forming the intermediate waveguide 104 can have a tapered end, i.e., the intermediate waveguide 104 can have a variable width laterally around the waveguides 101 and 103, as is shown in FIG. 13 in (a).

It is noted that in the case of transfer printing a second chip to a first chip, wherein the second chip is in intimate contact with the intermediate waveguide 104 of the first chip, the waveguide of the second chip functions as the second waveguide 103 of the waveguide structure 100.

The results of the simulation are shown in FIG. 13 in (b). It can be seen that this case has been optimised for TE mode only. In this case a total transition length of 600 µm is sufficient, even with a 1 µm misalignment between the chips.

The simulations shown in the FIGS. 9-13 demonstrate that with the waveguide structures 100 of the present invention, light can be efficiently transferred from a first waveguide 101 (or 103) to a second waveguide 103 in less than 500 µm length via an intermediate waveguide 104. Light can be transferred between two chips over a transition length of 300 µm (with a 1 µm gap) even allowing for a 1 µm misalignment. This length can be reduced to 200 µm, if the gap between the two chips can be controlled at 0.5 µm or below.

Using transfer-printing techniques, light can be transferred from a first waveguide 101 in a first chip to a second waveguide 103 in a second transfer printed chip in less than 700 µm.

Figure 14:
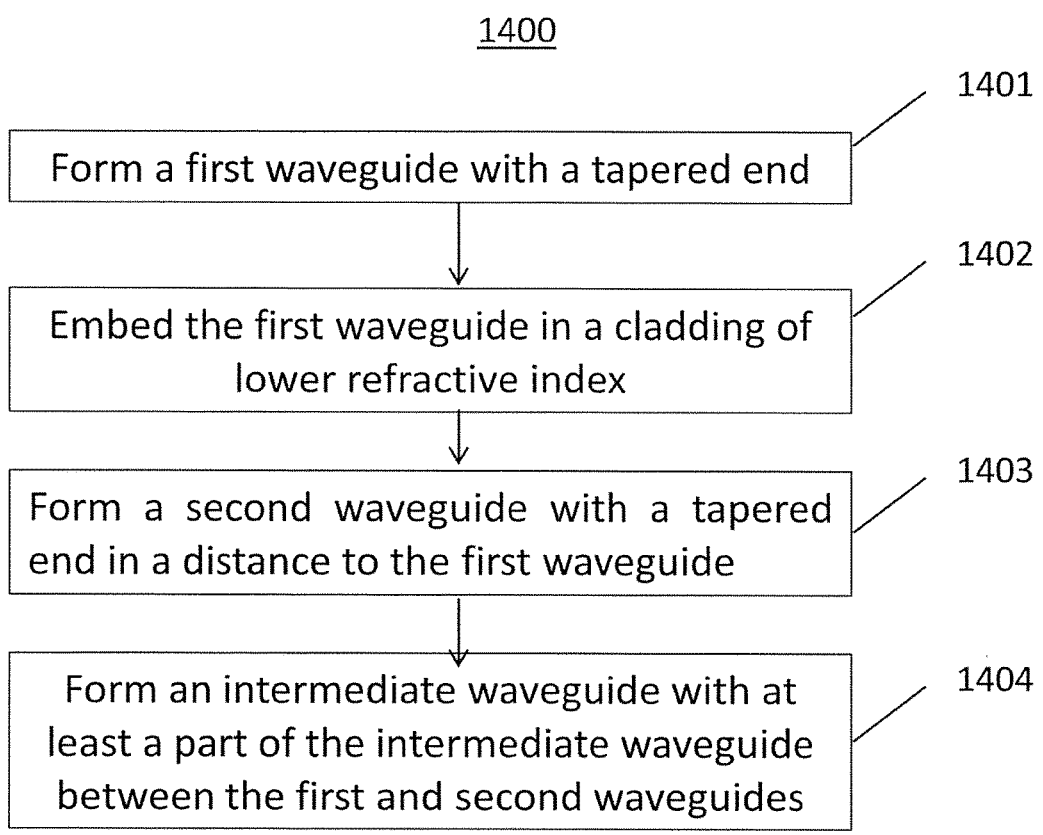
FIG. 14 shows a flow chart of a method according to an embodiment of the present invention.

FIG. 14 shows a flow chart of a method 1400 according to an embodiment of the present invention. In a first step 1401 of the method, a first waveguide 101 with a tapered end 101e is formed, and is then embedded, in a second step 1402, in a cladding 102 of lower refractive index than the first waveguide 101. In a third step 1402, a second waveguide 103 with a tapered end 103e is formed in a distance to the first waveguide 101. Further, in a fourth step 1404, an intermediate waveguide 104 is formed, wherein at least a part of the intermediate waveguide 104 is formed between the first waveguide 101 and the second waveguide 103. When forming the tapered ends 101e and 103e of the first and second waveguides 101 and 103, the tapered ends 101e and 103e are each designed for coupling light into and/or out of the intermediate waveguide 104. With the tapered ends 101e and 103e light can in particular be exchanged adiabatically with the intermediate waveguide.

With the present invention, a new coupling scheme is presented, which is suitable particularly for chip-to-chip coupling. Chips, which are optimised for different functions, e.g. SiN waveguide chips for passive optical functions, III-V InP for laser, SOI chip for high speed modulator/detector, can be easily coupled together with low optical coupling loss. The coupling scheme of the present invention is compatible with conventional CMOS technology.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A waveguide structure for optical coupling, the waveguide structure comprising:
    a first waveguide embedded in a cladding of lower refractive index than the first waveguide;
    a second waveguide of higher refractive index than the cladding and distanced from the first waveguide; and
    an intermediate waveguide, of which at least a part is arranged between overlapping portions of the first waveguide and the second waveguide, wherein the first waveguide and the second waveguide each comprise a tapered end for coupling light into and/or out of the intermediate waveguide, the tapered ends for the first waveguide and the second waveguide forming the overlapping portions of the first waveguide and the second waveguide, and wherein the intermediate waveguide is of higher refractive index than the cladding but of lower refractive index than the first and second waveguides.

2. The waveguide structure according to claim 1, wherein the intermediate waveguide is formed by or in a part of the cladding.

3. The waveguide structure according to claim 1, wherein the intermediate waveguide has a variable width between the tapered ends of the first and second waveguides.

4. The waveguide structure according to claim 1, wherein the intermediate waveguide is formed by a filled trench in the cladding.

5. The waveguide structure according to claim 4, wherein:
    the cladding comprises a lower cladding layer and an upper cladding layer, which cladding layers sandwich the first waveguide; and
    the filled trench is provided completely in the upper cladding layer and is arranged between the tapered ends of the first and second waveguides, respectively.

6. The waveguide structure according to claim 1, wherein:
    the second waveguide and/or the first waveguide has a refractive index of 1.8 or higher; and
    the cladding has a refractive index of 1.5 or lower.

7. The waveguide structure according to claim 1, wherein the tapered ends of the first and second waveguides taper from a width of about 0.4-1 μm to a width of about 0.1-0.2 μm over a length of about 200-800 μm.

8. The waveguide structure according to claim 1, wherein:
    the intermediate waveguide has a width of about 2 μm-4 μm; and/or
    the first and second waveguides each have a width of about 0.2-1 μm and a thickness of about 0.05-0.4 μm; and/or
    a distance between the first waveguide and the second waveguide is about 2-4 μm.

9. The waveguide structure according to claim 1, wherein the second waveguide and/or the first waveguide are made of silicon nitride.

10. The waveguide structure according to claim 1, wherein:
    the first and second waveguides belong to one chip; and
    the second waveguide is provided close to or on the surface of the chip.

11. the waveguide structure according to claim 1, wherein:
    the first waveguide belongs to a first chip; and
    the second waveguide belongs to a second chip, which second chip is transfer printed onto the first chip.

12. A chip comprising:
    a waveguide structure for optically coupling the chip to an object having at least one waveguide, the waveguide structure comprising,
    a first waveguide embedded in a cladding of lower refractive index than the first waveguide;
    a second waveguide of higher refractive index than the cladding and distanced from the first waveguide; and
    an intermediate waveguide, of which at least a part is arranged between overlapping portions of the first waveguide and the second waveguide, wherein the first waveguide and the second waveguide each comprise a tapered end for coupling light into and/or out of the intermediate waveguide, the tapered ends for the first waveguide and the second waveguide forming the overlapping portions of the first waveguide and the second waveguide, and wherein the intermediate waveguide is of higher refractive index than the cladding but of lower refractive index than the first and second waveguides.

13. A method of fabricating a waveguide structure for optical coupling, the method comprising:
    forming a first waveguide with a tapered end;
    embedding the first waveguide in a cladding of lower refractive index than the first waveguide;
    forming, in a distance to the first waveguide, a second waveguide with a tapered end; and
    forming an intermediate waveguide, wherein at least a part of the intermediate waveguide is formed between overlapping portions of the first waveguide and the second waveguide, wherein the tapered ends of the first and second waveguides are each configured for coupling light into and/or out of the intermediate waveguide, the tapered ends for the first waveguide and the second waveguide form the overlapping portions of the first waveguide and the second waveguide, and wherein the intermediate waveguide is of higher refractive index than the cladding but of lower refractive index than the first and second waveguides.

* * * * *